United States Patent [19]

Bürger et al.

[11] 4,436,643
[45] Mar. 13, 1984

[54] REGENERATION OF AQUEOUS DEGREASING AND CLEANING SOLUTIONS

[75] Inventors: Helga Bürger, Erkrath; Christian Rossmann, Langenfeld, both of Fed. Rep. of Germany

[73] Assignee: Henkel KGaA, Duesseldorf, Fed. Rep. of Germany

[21] Appl. No.: 371,288

[22] Filed: Apr. 23, 1982

[30] Foreign Application Priority Data

Sep. 19, 1981 [DE] Fed. Rep. of Germany ....... 3137341

[51] Int. Cl.$^3$ .......................... C11D 3/08; C23G 1/36
[52] U.S. Cl. ...................................... 252/135; 134/10; 252/117; 252/156; 210/708; 210/712; 210/727
[58] Field of Search .................... 252/135, 139, 156; 210/708, 712, 723, 727; 134/10, 13

[56] References Cited

U.S. PATENT DOCUMENTS

| | | | |
|---|---|---|---|
| 2,326,395 | 8/1943 | Samuel | 252/358 |
| 4,082,867 | 4/1978 | Henley et al. | 427/327 |
| 4,256,601 | 3/1981 | Sobata et al. | 252/135 |

FOREIGN PATENT DOCUMENTS 5070964 12/1974 Japan.
662504 4/1975 U.S.S.R..

*Primary Examiner*—John E. Kittle
*Assistant Examiner*—José G. Dees
*Attorney, Agent, or Firm*—Ernest G. Szoke; Henry E. Millson, Jr.

[57] ABSTRACT

Process for regenerating alkaline and neutral silicate-free and phosphate-free cleaning solutions that are contaminated with emulsified mineral or natural oils by (a) adding thereto an alkali metal phosphate and/or an alkali metal silicate, and then (b) adding a soluble calcium and/or magnesium salt to the resulting solution.

11 Claims, No Drawings

REGENERATION OF AQUEOUS DEGREASING AND CLEANING SOLUTIONS

BACKGROUND OF THE INVENTION

Aqueous solutions containing surfactants and sometimes socalled builder-substances, such as an alkali metal hydroxide or an alkali metal carbonate, complexing agents, and organic and inorganic corrosion inhibitors are used in industrial degreasing and cleaning operations, particularly in the degreasing and cleaning of metal surfaces. Quite frequently these solutions also contain silicates and/or phosphates. However, for the electrolytic cleaning or spray cleaning of machined parts, certain products can be used that do not contain either silicates or phosphates. For alkaline cleaners, especially for products formulated for electrolytic degreasing, the addition of a surfactant is often omitted. During use, cleaning solutions become contaminated with mineral oil and/or natural oils, as well as with emulsifiers, corrosion inhibitors, and other oily additives. The presence of these contaminants, which are emulsified in the solution by the emulsifier content of the oil and by any surfactants present in the cleaning solution, may cause a decrease in the effectiveness of the aqueous solution, and eventually, will render it inoperative. The solutions must then be replaced. If the spent solutions are alkaline, they must first be neutralized and oils contained in them must be removed in accordance with existing regulations before the solutions can be discarded. Neutralization alone will generally not result in adequate oil separation, i.e. neutralization will not usually break the emulsion. The emulsion can be broken by several methods, e.g. by lowering the pH of the solution to about 1; by treating the solution with salt; or by adding flocculating agents, such as aluminum or iron salts, in the acid range, followed again by neutralization. The components of the cleaning solution are of course lost when the solution, now free of oil, is discarded. Also, treatment of the waste water containing the discarded cleaning solution is generally required. Therefore, it is clearly advantageous to regenerate such spent cleaning solutions so that they can be re-used.

The regeneration of aqueous degreasing solutions can be achieved according to known methods either by means of ultrafiltration or by using centrifugal separators. When using centrifugal separators, only those degreasing solutions can be treated in which the oils and contaminants do not form stable emulsions. In addition, this process, like ultrafiltration, requires a considerable quantity of equipment, is time consuming, and is often energy intensive, making such regeneration processes relatively expensive. The reason why such processes have high equipment requirements is that in many instances the contaminants consist not only of organic substances but also of particles that are not soluble in water.

DETAILED DESCRIPTION OF THE INVENTION

Surprisingly, it has now been found that alkaline as well as neutral silicate-free and phosphate-free degreasing and cleaning solutions contaminated with emulsified mineral and/or natural oils can be readily regenerated by chemical means. The process of the present invention is carried out by the steps of (a) adding to such a contaminated degreasing and cleaning solution from about 1 to about 5 g/l, preferably from about 2 to about 4 g/l, of either (1) at least one alkali metal phosphate, (2) at least one alkali metal silicate, or (3) a mixture of at least one alkali metal phosphate and at least one alkali metal silicate; and (b) adding to the resulting solution either (1) from about 0.3 to about 2 g/l, preferably from about 0.6 to about 1.2 g/l, of calcium ions, (2) from about 0.2 to about 1.2 g/l, preferably from about 0.35 to about 0.7 g/l, of magnesium ions, or (3) a mixture of calcium ions and magnesium ions in amount chemically equivalent to from about 0.3 to about 2 g/l, preferably from about 0.6 to about 1.2 g/l of calcium ions.

In the above process, it is also preferable to add a quantity of calcium and/or magnesium ion in step (b) that is chemically equivalent to the phosphate and/or silicate ions added to the solution in step (a).

As a result of the above treatment, the emulsion is broken, resulting in an oily layer at the top of the solution, which can be readily removed by decantation. Also, a precipitate forms which is readily separated from the aqueous solution by conventional means such as filtration.

The present process does not produce any significant change in the pH of the cleaning solution, thus rendering the regenerated cleaning solution suitable for use as is after the oily layer and the precipitate have been removed.

The cleaning and degreasing solutions which can be regenerated according to the process of the present invention can have a pH between 7 and 14. The process of the invention is designed to regenerate aqueous cleaning and degreasing solutions that are free of phosphates and silicates. Such cleaning and degreasing solutions may however contain alkalis such as alkali metal hydroxides, alkali metal carbonates, and alkali metal borates, as well as complexing agents, such as complexing phosphonic acids or phosphono-carboxylic acids, e.g., 1-hydroxyalkane-1,1-diphosphonic acid, 1-aminoalkane-1,1-diphosphonic acid or aminotrimethylene-triphosphonic acid and their alkali metal salts. These cleaning and degreasing solutions may also contain inorganic and/or organic corrosion inhibitors.

Furthermore, the cleaning and degreasing solutions may include one or more nonionic surfactants in order to produce good cleaning results. Nonionic surfactants often used include the addition products of ethylene oxide and, optionally, propylene oxide with either fatty alcohols, fatty acids, or fatty amines, especially those with 12 to 18 carbon atoms in the alkyl radical, as well as alkylamines with 6 to 15 carbon atoms. Block polymers prepared from ethylene oxide and propylene oxide are also in common use. Nonionic surfactants, when present, are usually present in the range of about 0.1 to about 5 g/l.

The presence of anionic surfactants in the cleaning and degreasing solutions to be treated by the present process is not desired because these surfactants interfere with the settling of the precipitate and the proper separation of the oily layer. Therefore, they should not be present or, if present, then only in small quantities in relation to the quantity of nonionic surfactant.

The contaminated degreasing and cleaning solution to be treated by the process of the invention is mixed with the alkali metal phosphates and/or alkali metal silicates, which are added either as solids or in aqueous solution. Such mixing can be carried out with the contaminated cleaning solution at its operating temperature or at room temperature, whichever is most convenient.

The alkali metal phosphates can be alkali metal orthophosphates or alkali metal polymerized phosphates, preferably alkali metal diphosphates.

In accordance with the present invention, the term "alkali metal" when used herein means sodium or potassium, with sodium preferred.

The alkali metal silicates useful in the present process must have a molar ratio of $SiO_2:Na_2O$ or $SiO_2:K_2O$ of about 1:1 to about 4:1, preferably about 2:1 to about 3.5:1.

After the silicates and/or phosphates are dissolved in the contaminated cleaning solution, the source of calcium and/or magnesium ions is added to the cleaning solution, preferably as an aqueous solution. As a source of calcium ions, soluble calcium salts are employed, with calcium nitrate and calcium chloride being preferred. As a source of magnesium ions, soluble magnesium salts are employed, with magnesium nitrate, magnesium sulfate, and magnesium chloride preferred. The salts may be used individually or as a mixture.

When adding only alkali metal silicates, i.e. without any alkali metalphosphate, to the cleaning solution to be regenerated, a small quantity, e.g. about 4 to about 8 g/l, of aluminum and/or iron (III) ions in the form of soluble salts thereof may be added in addition to the soluble calcium and/or magnesium salts.

After thorough mixing, the precipitate of calcium and/or magnesium phosphates or silicates will settle out and the oils may be readily decanted. In order to improve the rate of sedimentation of the precipitate, polyelectrolyte-based flocculating agents, preferably polyacrylamides, may be added. After decanting the oily layer and removing the precipitate, the cleaning solution may be used again in the same manner as a freshly prepared solution.

Any imbalance in the components of the solution due to the instant regeneration process can be adjusted to give the desired concentration by adding water and by replenishing with fresh components, as needed. However, usually the cleaning solution becomes fully operational again without replenishment of any of its ingredients. Only in rare instances is replenishment with surfactants required. As stated earlier, changes in the pH of the cleaning solutions, which might decrease cleaning efficiency, do not occur during regeneration.

The regenerating process for the same cleaning solution may be repeated several times as the solution becomes contaminated with fresh contaminants, and the number of regenerations is only limited by the extent to which salts accumulate in the solution.

The following examples are given for illustration purposes only and are not meant to limit the scope of the invention. When data is given in %, % by weight is meant unless otherwise indicated.

EXAMPLE I

An aqueous degreasing and cleaning solution containing 1.5% of a so-called neutral cleaner having the following composition:

35% alkanolamine stearate
2% 1-hydroxyethane-1,1-diphosphonic acid
5% mercaptobenzotriazole
3% block polymerisate of ethylenediamine, 30 moles ethylene oxide, and 60 moles propylene oxide
1% adduct consisting of 10 moles ethylene oxide with $C_{12}$ to $C_{16}$ fatty amine
54% water and contaminated with a stable emulsion of 20 g/l of a drilling oil containing mineral oil, petroleum sulfonate, soap, and nonionic surfactants was employed in this example. The emulsion could not be separated either by use of a centrifugal separator, nor broken when 10 g/l of aluminum sulfate was added to a portion thereof. 2 g/l sodium diphosphate, followed by 12.5 ml/l of a 20% solution of calcium nitrate, corresponding to 0.6 g/l calcium ions, were added to the remainder of the emulsified solution. The emulsion broke, and only about 350 mg/l drilling oil remained in the aqueous neutral cleaning and degreasing solution. After regenerating as above, decanting off the oily upper layer and removing the precipitate, the cleaning solution was used for another cleaning cycle without loss of any of its efficiency.

The same result was obtained when 2 g/l of sodium metasilicate, followed by 10 ml/l of a 20% solution of calcium chloride, corresponding to 0.7 g/l of calcium ions, were added while stirring to another sample of the above used cleaning solution. The mineral oil content of the aqueous phase dropped below 20 mg/l.

EXAMPLE II

An aqueous electrolytic degreasing bath containing 45 g/l sodium
5 g/l sodium gluconate was contaminated with 10 g/l of a mineral oil emulsion. In order to break the emulsion, 2 g/l sodium diphosphate was added, and after complete dissolution of the phosphate, a calcium chloride solution was added while stirring. For each liter of degreasing bath, 8.5 ml of a 20% solution of calcium chloride was employed. In order to improve sedimentation of the phosphate precipitate, 0.5 ppm of a polyacrylamide was added as a flocculating agent. After decanting the oil phase, the aqueous solution contained only 200 mg/l mineral oil. The gluconate content remained the same, and the degreasing bath was then re-used successfully.

EXAMPLE III

An aqueous degreasing and cleaning solution containing 2% of a so-called neutral cleaner having the following composition:

25% diethanolamine
10% $C_8$ to $C_{12}$ fatty acid
5% alkylamineethoxylate adduct of $C_{12}$–$C_{16}$ fatty amine with 10 moles ethylene oxide
5% block polymer of ethylenediamine and 30 moles ethylene oxide as well as 60 moles propylene oxide
55% water was contaminated with 10 g/l of mineral oil in the form of an emulsion. To bring the cleaning solution back to full efficiency, 2 g/l of sodium diphosphate were dissolved in the solution, and the phosphate precipitated with 20 ml/l of a calcium/magnesium nitrate solution containing 15 g/l calcium ions and 9 g/l magnesium ions. After decanting the oil phase and filtering off the precipitate, the neutral cleaner solution exhibited its former cleaning efficiency, and was sprayed without foaming. The mineral oil content was now below 100 mg/l.

What is claimed is:

1. A process for regenerating an alkaline or neutral silicate-free and phosphate-free aqueous degreasing and cleaning solution contaminated by emulsified mineral oil, natural oil, or a mixture thereof, comprising the steps of
    (a) adding to said contaminated solution from about 1 to about 5 g/l of either (1) at least one alkali metal phosphate, (2) at least one alkali metal silicate, or (3) a mixture of at least one alkali metal phosphate and at least one alkali metal silicate, and
    (b) adding to said contaminated solution either (1) from about 0.3 to about 2 g/l of calcium ions, (2) from about 0.2 to about 1.2 g/l of magnesium ions, or (3) a quantity of a mixture of calcium ions and magnesium ions chemically equivalent to from about 0.3 to about 2 g/l of calcium ions.

2. A process in accordance with claim 1 wherein in step (a) the concentration range is from about 2 to about 4 g/l.

3. A process in accordance with claim 1 wherein the concentration range in step (b)(1) and (b)(3) is from about 0.6 to about 1.2 g/l of calcium ions, and the concentration range in step (b)(2) is from about 0.35 to about 0.7 g/l of magnesium ions.

4. A process in accordance with claim 1, 2 or 3 wherein the alkali metal silicate in step (a) has a mole ratio of silicon dioxide to alkali metal oxide of from about 1:1 to about 4:1.

5. A process in accordance with claim 1, 2 or 3 wherein the alkali metal phosphate in step (a) is an alkali metal diphosphate.

6. A process in accordance with claim 1, 2 or 3 wherein in step (b) the source of calcium ions is calcium nitrate, calcium chloride, or a mixture thereof, and the source of magnesium ions is magnesium nitrate, magnesium sulfate, magnesium chloride, or a mixture of at least two thereof.

7. A process in accordance with claim 1, 2 or 3 in which the ions added in step (b) are added in an amount chemically equivalent to the total amounts of phosphate and silicate ions added in step (a).

8. A process in accordance with claim 1, 2 or 3 wherein at least one alkali metal silicate is employed as the additive in step (a), and wherein a small quantity of either (i) a soluble salt of aluminum, (ii) a soluble salt of ferric iron, or (iii) a mixture of a soluble salt of aluminum and a soluble salt of ferric ion, is also added to the contaminated degreasing and cleaning solution.

9. A process in accordance with claim 1, 2 or 3 wherein after step (b) a polyelectrolyte-based flocculating agent is added to the solution.

10. A process in accordance with claim 1, 2 or 3 wherein the contaminated degreasing and cleaning solution also contains from about 0.1 to about 5 g/l of a nonionic surfactant.

11. A process in accordance with claim 1, 2 or 3 wherein following step (b) the resulting oily layer and precipitate are removed from the regenerated degreasing and cleaning solution.

* * * * *